(12) United States Patent
Kleppe et al.

(10) Patent No.: US 11,221,297 B2
(45) Date of Patent: Jan. 11, 2022

(54) ACCELERATED METHODS AND APPARATUSES FOR THREE-DIMENSIONAL MICROSCOPY WITH STRUCTURED ILLUMINATION

(71) Applicant: Carl Zeiss Microscopy GmbH, Jena (DE)

(72) Inventors: Ingo Kleppe, Jena (DE); Yauheni Novikau, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 167 days.

(21) Appl. No.: 16/676,762

(22) Filed: Nov. 7, 2019

(65) Prior Publication Data

US 2020/0150043 A1    May 14, 2020

(30) Foreign Application Priority Data

Nov. 12, 2018  (DE) .................... 10 2018 009 056.7

(51) Int. Cl.
| | |
|---|---|
| *G02B 21/00* | (2006.01) |
| *G01N 21/64* | (2006.01) |
| *G02B 21/06* | (2006.01) |
| *G02B 21/36* | (2006.01) |
| *G06T 17/00* | (2006.01) |

(52) U.S. Cl.
CPC ..... *G01N 21/6458* (2013.01); *G02B 21/0076* (2013.01); *G02B 21/06* (2013.01); *G02B 21/361* (2013.01); *G06T 17/00* (2013.01)

(58) Field of Classification Search
CPC .. G02B 21/0076; G02B 21/06; G02B 21/361; G02B 21/00; G02B 21/0004;
(Continued)

(56) References Cited

U.S. PATENT DOCUMENTS

| | | | |
|---|---|---|---|
| 2008/0088920 A1 | 4/2008 | Wolleschersky | |
| 2010/0224796 A1* | 9/2010 | Mertz | ................ G02B 21/0076 250/459.1 |

(Continued)

FOREIGN PATENT DOCUMENTS

| | | |
|---|---|---|
| DE | 19908883 A1 | 9/2000 |
| DE | 102010049627 A1 | 5/2011 |

(Continued)

OTHER PUBLICATIONS

German Search Report dated Jun. 12, 2019.
(Continued)

*Primary Examiner* — Arnel C Lavarias (74) *Attorney, Agent, or Firm* — Duane Morris LLP (57) ABSTRACT

Accelerated methods and apparatuses for three-dimensional microscopy with structured illumination, in which focal planes of the sample are focused and each focal plane is illuminated in a plurality of phases sequentially with structured illumination light and the sample light emitted by the sample is recorded in a respective individual image. A resulting image having a resolution that is increased with respect to the individual images is reconstructed from the individual images to produce a super-resolved image stack, By reconstructing a resulting image from individual images of two different focal planes by approximation methods, said resulting image represents a sample plane that is situated between said focal planes, an image stack can be produced in a shorter period with less stress on the sample.

26 Claims, 3 Drawing Sheets

(58) Field of Classification Search
CPC .. G02B 21/002; G02B 21/0024; G02B 21/21; G02B 21/0032; G02B 21/0036; G02B 21/004; G02B 21/0052; G02B 21/0056; G02B 21/006; G02B 21/008; G02B 21/36; G02B 21/365; G02B 21/367; G01N 21/6458; G06T 17/00
USPC ....... 359/368, 362, 363, 369, 385, 388, 389, 359/390
See application file for complete search history.

(56) References Cited

U.S. PATENT DOCUMENTS

2018/0239946 A1* 8/2018 Hoffman .............. G02B 21/367
2020/0225456 A1* 7/2020 Dowaki ................ G01N 21/64

FOREIGN PATENT DOCUMENTS

| DE | 102011077269 A1 | 12/2012 |
| DE | 102014004249 A1 | 9/2015 |
| DE | 102015107367 A1 | 11/2016 |

OTHER PUBLICATIONS https://en.wikipedia.org/wiki/Dirac_comb Oct. 3, 2019.

Gustafsson. M.G.L.; "Surpassing the lateral resolution limit by a factor of two using structured Illumination microscopy" Journal of Microscopy 2000; 198(2):82-87.

Muller, Claus B., et al.; "Image Scanning Microscopy"; Physical Review Letters 2010; 104:198101(-1)-198101(-4).

* cited by examiner

ACCELERATED METHODS AND APPARATUSES FOR THREE-DIMENSIONAL MICROSCOPY WITH STRUCTURED ILLUMINATION

RELATED APPLICATIONS

The present application is a non-provisional application that claims priority to German Application No. DE 10 2018 009 056.7 filed on Nov. 12, 2018, the contents of which is hereby incorporated by reference in its entirety.

FIELD OF THE INVENTION

The invention relates to methods and apparatuses for imaging a sample using a microscope. When using the microscope, a focal plane of the sample is focused and the focal plane is illuminated in a plurality of phases sequentially with structured illumination light. The sample light emitted and/or scattered by the sample per phase is recorded using a detector in a respective (structured) individual image, such that a resulting image having increased (with respect to the individual images) resolution is able to be reconstructed from the individual images. Structured in this case means that the illumination light in the sample has at least one component with a constant spatial frequency.

BACKGROUND OF THE INVENTION

The resolution of microscopes is dependent, on account of the diffraction of the light received by the sample in the microscope objective, on the aperture thereof and on the wavelength of the light. Since the utilizable wavelength range of the visible light is finite, the resolution of a microscope is limited in principle (Abbe 1873). With respect to the spatial frequencies of the sample that are to be imaged, this means that the support of the optical transfer function of the microscope in the frequency space is limited to a finite region around the coordinate origin. Consequently, the microscope can image only spatial frequencies that lie in the central interval in which the support does not vanish.

With structured illumination of the sample (SIM—"structured illumination microscopy"), the resolution can be improved laterally approximately by a factor of two if the excitation intensity of the illumination and the emission intensity of the sample have a linear relationship. SIM is disclosed for example in DE 199 08 883 A1 and in the essay "Surpassing the lateral resolution limit by a factor of two using structured illumination microscopy" by M. Gustafsson (Journal of Microscopy, Volume 198, 2000, page 82). It is based on the generation of a spatial light structure on the sample to be examined, for example by sinusoidal interference of the illumination light downstream of an optical grating. Due to the convolution of the sample response with the point spread function (PSF) of the microscope objective in real space, a region of spatial frequencies of the sample structure that lie outside the support of the OTF in the frequency domain is shifted into the central support interval where they superpose the original spatial frequency intensities there. The light structure is produced sequentially in a plurality of different phase positions, and in each case an individual image is recorded in each phase position.

According to the SIM method it is possible by solving a system of equations describing the interactions to reconstruct, from a set of such individual images that contain the superpositions of the shifted and the original spatial frequencies, a consistent resulting image that contains both the original spatial frequencies of the support interval and the original higher spatial frequencies which have been temporarily shifted into the support interval by the structured illumination.

Consequently, the resulting image has a higher lateral resolution than a conventional single recording with uniform illumination. This resolution is referred to as super resolution, because it is finer than the diffraction-limited resolution. However, the multiple recording with different phase positions and orientations of the structuring requires high stability of the optical arrangement and of the sample during the entire measurement duration. In addition, the required number of individual images reduces the effective frame rate.

In addition to improving the lateral resolution (transversely to the optical axis of the detection), SIM can also be utilized to produce an optical section through the sample with improved axial resolution (along the optical axis of the detection) from a set of individual images of a focal plane (what is known as OS-SIM). The resulting image is then a quasi-confocal one, and the axial resolution also approximately corresponds to that of a confocal microscope. If a number N of focal planes in each case a set of images with structured illumination is recorded, a z-stack of quasi-confocal resulting images can be reconstructed therefrom.

However, the SIM can thus also be expanded to a plurality of focal planes such that super resolution can also be achieved axially (what is known as 3D-SIM). To this end, the illumination in the sample must also be axially structured, and for each of N focal planes, a dedicated set of individual images from the relevant focal plane is recorded. From a system of equations that describes the interactions in all N focal planes, it is possible to calculate a z-stack from N axially, in particular also laterally, super-resolved resulting images. In order to obtain a complete z-stack, the focal planes must, on account of the Nyquist-Shannon sampling theorem, be arranged at a distance from one another of at most half a minimum distance that is axially optically resolvable by the microscope (that is to say according to an axial resolution that is twice as fine compared to the optical resolution), that is to say for example approximately 110 nm for a high-aperture objective with NA=1.4.

An improvement of the resolution that goes beyond SIM can be attained by virtue of the sample being excited (using illumination or in another way) in a manner such that a non-linear relationship between the excitation intensity and the light intensity emitted by the sample is produced ("saturated pattern excitation microscopy"; SPEM). SPEM is disclosed, for example, in DE 199 08 883 A1. In the case of fluorescence microscopy, non-linear excitation is accomplished for example by way of a high illumination intensity which in the region of the illumination structure results in partial saturation of the excitation of the fluorescent dye. As a result, even higher spatial frequencies of object structures than in the case of SIM are shifted into the interval of the support of the OTF. By taking into consideration the non-linear interaction in the system of equations to be solved, it is also possible to reconstruct these higher frequencies. However, in the case of SPEM, smaller phase steps and consequently even more individual images than in the case of SIM are necessary. SPEM can also be performed in three dimensions.

SUMMARY OF THE INVENTION

The invention is based on the object of improving the methods and microscopes of the type mentioned in the introductory part such that the measurement duration can be shortened and the sample load can be reduced.

The object is achieved by a method and by a microscope having the features set forth in the annexed claims.

Advantageous refinements of the invention are specified in the dependent claims.

Provision is made according to the invention for the microscope to be used to focus a second focal plane, different from the first focal plane, and to record individual images in different illumination phases for said second focal plane, too, and for a resulting image to be reconstructed from the individual images of the two focal planes, which resulting image represents a sample plane located between said focal planes. However, no individual images of this additional sample plane are recorded (said additional sample plane is not focused) or in any event no individual images during the recording of which said additional sample plane is focused are used in the reconstruction of the resulting image.

Different focal planes can be focused for example by moving the sample in the z-direction, by moving the objective in the z-direction or possibly by adjusting internal focusing of the objective.

A principle of the invention is that, on the basis of the (specified, measured, calculated or estimated) point spread function, it is also possible to ascertain from a set of individual images that have been recorded under structured illumination from a single focal plane, information relating to other planes (that is to say intensities from these other planes) than the focal plane, because a microscope also captures other sample planes than the instantaneous focal plane on account of its finite depth of field. Said other sample planes may not be imaged sharply, but this is precisely where a utilizable piece of depth information lies. Said piece of depth information is used in the OS-SIM for discriminating out-of-focus light. The intensity detected from outside the focal plane, however, is lost without being used.

Instead, it can advantageously be used for calculating an image of an out-of-focus sample plane. All that is necessary in the case of a PSF that is typically mirror-symmetric with respect to the focal plane (and is typically rotationally symmetric about the optical axis of the detection) is to resolve the ambiguity of the depth information that results from the mirror symmetry. This is accomplished by using depth information from two different focal planes to reconstruct a sample plane that is located therebetween.

According to the invention, it has been found that the system of equations known from 3D-SIM (or 3D-SPEM) can be used to reconstruct a resulting image from such an additional sample plane, even though no individual images were recorded for said additional sample plate.

In this way, the number of the focal planes necessary for recording a z-stack can advantageously be reduced by selecting the distances between the focal planes to be greater than half a minimum axial distance that is optically resolvable by the microscope (that is to say corresponding to an axial resolution that is less than twice as fine compared to the optical resolution) and thereby initially formally violating the Nyquist-Shannon sampling theorem. By incorporating the additional (non-focused) sample planes in an approximate evaluation, the Nyquist-Shannon sampling theorem is effectively fulfilled. The additional sample planes can be considered to be "apparent" focal planes and be described as focal planes in the SIM system of equations. On account of the invention, the recorded focal planes can be situated for example with an axial distance of approximately 330 nm from one another, and yet it is possible to calculate complete resulting images of planes with an axial distance of only approximately 110 nm. Since, for each of the additional sample planes that have been included only by calculation (apparent focal planes), in each case a "real" focal plane can be omitted, the recording of individual images in a correspondingly large number of illumination phases is dispensed with. In this way, the measurement duration is significantly shortened and in the same way the sample is stressed less because it needs to be illuminated less frequently and consequently for a shorter time overall.

Preferably, the two focal planes between which the additional sample plane is situated are spaced apart at most by a distance such that the depth regions that are determined by the depth of field of the microscope and have been recorded in the individual images overlap one another along the optical axis. In other words, the two focal planes between which the additional sample plane is situated are preferably spaced apart by a smaller distance than a minimum axial distance that is optically resolvable by the microscope (that is to say corresponding to an axial resolution that is finer than the optical resolution), but preferably further than half the minimum optically resolvable distance as described above. These distance conditions can also be expressed approximately by the dimensions of the PSF: The distance between the focal planes between which the additional sample plane is situated is preferably selected such that it is greater than one full width at half maximum (FWHM) of the PSF in the axial direction. The distance between the focal planes between which the additional sample plane is situated is preferably selected such that it is smaller than two full widths at half maximum of the PSF in the axial direction.

Preferably, at least one solution of a system of equations describing the interaction of the light structure with optical properties of the sample and with the point spread function of the microscope both in the focal planes and in the sample plane that is situated between the focal planes is approximately ascertained. In particular, the following system of equations or a system of equations that is mathematically equivalent can be used:

$$IS_{em}^f(k_x, k_y, k_z) = \sum_k \int dk'_x dk'_y dk'_z I^f(k'_x, k'_y, k'_z) S^f\left(k_x - k'_x, k_y - k'_y, k_z - \frac{k}{\Delta z}\right) H^f\left(k_x, k_y, k_z - \frac{k}{\Delta z} - k'_z\right).$$

Particularly advantageous are embodiments in which, for an approximate solution, a linear regression, in particular a regularization, is used, in particular a truncated singular value decomposition in which only a real subset of all singular values is ascertained.

The accuracy of the approximation can be improved by optically oversampling the individual images laterally, in particular by recording them with a resolution that is twice as fine as the optical resolution of the optical system of the microscope. To this end, the following system of equations or a system of equations that is mathematically equivalent can be used:

$$IS_{em}^{f}\left(k_x - \frac{i}{\Delta x}, k_y - \frac{j}{\Delta y}, k_z\right) =$$

$$\sum_k \int dk'_x dk'_y dk'_z I^f(k'_x, k'_y, k'_z) S^f\left(k_x - k'_x, k_y - k'_y, k_z - \frac{k}{\Delta z}\right) \times$$

$$H^f\left(k_x - \frac{i}{\Delta x}, k_y - \frac{j}{\Delta y}, k_z - \frac{k}{\Delta z} - k'_z\right).$$

Preferably, the structured illumination is effected such that the light structure produced in the sample is regularly structured, in particular with lateral periodicity and/or axial periodicity, wherein it is arranged in particular at a different position and/or in a different orientation in each of the illumination phases.

In particular, in advantageous embodiments, the resulting image, which represents the additional sample plane that is situated between the focal planes, can be reconstructed with a lateral and/or axial resolution that is increased as compared to the individual images of the focal plane. However, it is not absolutely necessary to reach super resolution. For example, it is also possible to create only optical sections of the focal planes and of the additional sample plane(s) with quasi-confocal resolution, as in OS-SIM.

It is equivalent to the solution of a system of equations to approximately deconvolve the individual images on the basis of a model of a point spread function of the microscope, in particular after separating the illumination phases by calculation.

The reconstruction of an additional plane that is not focused is correspondingly accomplished by virtue of the fact that, in the deconvolution, an (intensity) portion of one of the individual images, in particular of exactly one pixel, is assigned to different resulting images. Preferably, in the deconvolution, an (intensity) portion of one of the individual images, in particular of exactly one pixel, is assigned partially to at least one of the resulting images that represents one of the focal planes and partially to the resulting image which represents the sample plane that is situated between the focal planes. In particular, the assignment to the resulting image that represents the sample plane that is situated between the focal planes can be accomplished on the basis of intensities of individual images of at least the two nearest focal planes.

Expediently, a two-dimensionally spatially resolving detector is used to record the individual images, wherein in particular no stop that optically sections the sample is arranged in front of the detector. As a result, quick recording of the individual images is accomplished. Alternatively, confocal, scanning detection is possible.

Particularly preferred are embodiments in which the point spread function of the microscope is not manipulated for producing an axial asymmetry. This keeps the outlay in terms of apparatus low. In particular, it is possible in this way to dispense with a complex and costly phase mask.

Likewise particularly preferred are embodiments in which during the recording of each of the individual images only exactly one focal plane is focused. In this way, it is possible to dispense with complicated optics for simultaneously imaging a plurality of focal planes.

The invention of the microscope has a control unit that is configured for carrying out one of the above-described methods. In addition, the microscope has a light source, means for focusing different focal planes in a sample (for example an adjustable objective, an adjustable sample stage or a wavefront manipulator in the detection beam path), a two-dimensionally spatially resolving detector for recording individual images from the instantaneous focal plane, and means for producing structured illumination light in the sample, for example a diffraction grating, a spatial light modulator (SLM), a micromirror array (DMD) or light guides that in a rear focal plane of the microscope objective provide a pattern that interferes in the sample to form a light structure. It is also possible that the means for producing structured illumination light are realized in the light source, for example in the form of a light-emitting diode array.

To the extent that method steps are described, the control unit of the microscope can be configured for performing these method steps.

The invention can be realized with fluorescent or non-fluorescent samples. In the case of a fluorescent sample, the light source is expediently embodied for the excitation of the fluorescent dye that is provided in the sample. The light source preferably comprises one or more lasers, in particular also an adjustable intensity modulator, to make a wide variation of the excitation intensity possible.

BRIEF DESCRIPTION OF THE DRAWINGS

The invention is explained in more detail below on the basis of exemplary embodiments.

In the drawings.

DETAILED DESCRIPTION OF EMBODIMENTS OF THE INVENTION

In all of the drawings, corresponding parts have the same reference signs.

Figure 1:
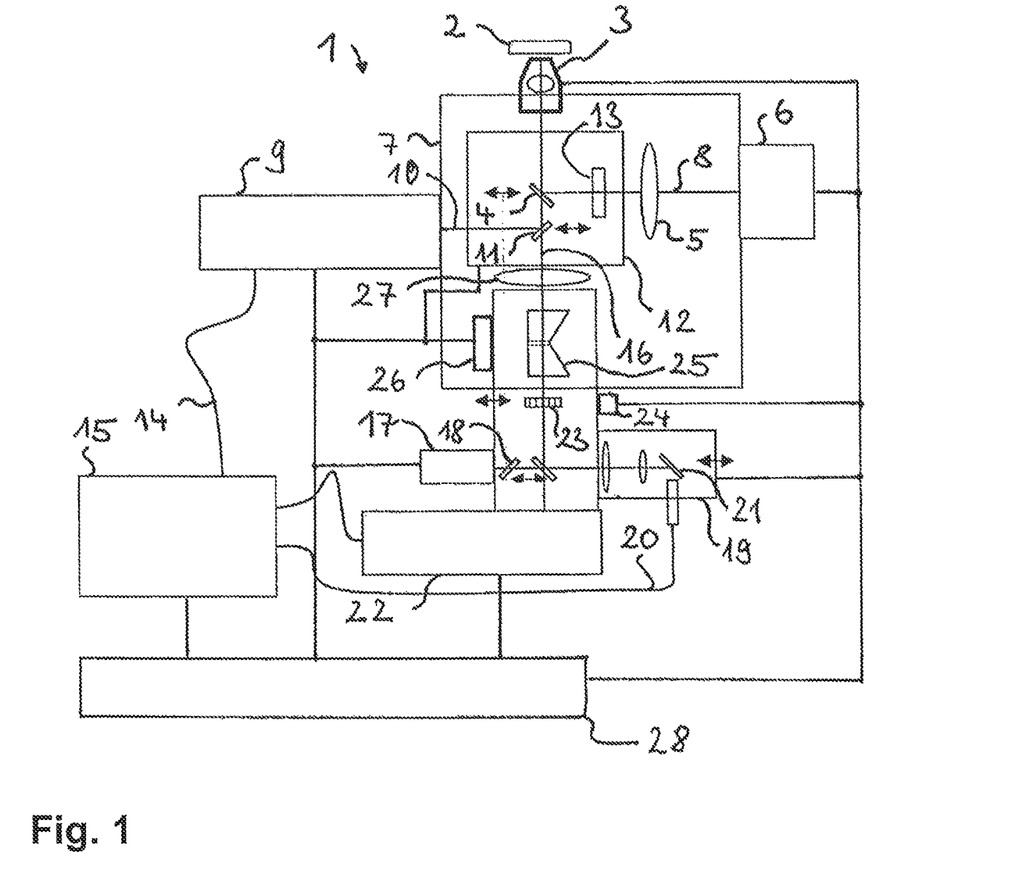
FIG. 1 schematically illustrates a microscope.

FIG. 1 shows a microscope 1 that is capable of performing both classical microscopy methods, that is to say microscopy methods the resolution of which is diffraction-limited, and super-resolution microscopy methods, that is to say microscopy methods the resolution of which goes beyond the diffraction limit.

The microscope 1 captures a sample 2. In addition, it has an objective 3 through which the radiation for all microscopy methods passes.

The objective 3 images, via a beam splitter 4, the sample together with a tube lens 5 on a CCD detector 6, which in the example is a generally possible area detector. To this extent, the microscope 1 has a conventional light microscope module 7, and the beam path from the sample 2 through the objective 3 and the tube lens 5 to the CCD detector 6 corresponds to a conventional widefield detection beam path 8. As indicated by the double-headed arrow in FIG. 1, the beam splitter 4 is interchangeable so as to be able to switch between beam splitters having different dichroic properties or achromatic beam splitters as per US 2008/0088920.

Furthermore connected in the beam path to the objective 3 is a laser scanning module 9, the LSM illumination and detection beam path of which is coupled into the beam path to the objective 3 via a switching mirror 11, which likewise possesses beam splitter functions. The beam path from the switching mirror 11 to the objective 3 through the beam splitter 4 is thus a beam path in which the illumination beam path and the detection beam path are combined. This is true both with respect to the laser scanning module 9 and also with respect to the widefield detection beam path 8, because, as will be explained below, illumination radiation which, together with the widefield detection beam path 8, i.e. the CCD detector 6, realizes microscopy methods, is also coupled in at the switching mirror 11.

The switching mirror 11 and the beam splitter 4 are combined to form a beam splitter module 12, as a result of which there is the possibility of interchanging the switching mirror 11 and the beam splitter 4 depending on the application. This is also illustrated by the double-headed arrows. Furthermore provided in the beam splitter module 12 is an emission filter 13 that is located in the widefield detection beam path 8 and appropriately filters the spectral components that can propagate through the widefield detection beam path 8. The emission filter 13 in the beam splitter module 12 is of course likewise interchangeable.

The laser scanning module 9 receives laser radiation required for the operation from a laser module 15 via an optical fiber 14.

In the construction illustrated in FIG. 1, a collective illumination beam path 16, through which the illumination radiation for various microscopy methods passes, is coupled in at the beam splitter module 12, more specifically at the switching mirror 11. Different illumination beam paths of individual illumination modules are coupled into this collective illumination beam path 16. For example, a widefield illumination module 17 couples widefield illumination radiation into the collective illumination beam path 16 via a switching mirror 18, such that the sample 2 is illuminated in widefield via a tube lens 27 and the objective 3. The widefield illumination module 17 can have an HBO lamp, for example. Provided as a further illumination module is a TIRF illumination module 19, which realizes TIRF illumination with the appropriate positioning of the switching mirror 18. The TIRF illumination module 19 to this end receives radiation from the laser module 15 via an optical fiber 20. The TIRF illumination module 19 has a mirror 21 that is longitudinally displaceable. On account of the longitudinal displacement, the illumination beam emitted by the TIRF illumination module 19 is displaced perpendicularly to the main propagation direction of the emitted illumination beam, as a result of which the TIRF illumination is incident at the objective 3 at an adjustable angle with respect to the optical axis of the objective. In this way, the required angle of total internal reflection at the coverslip can be ensured. Other means are of course also suitable for effecting this angle adjustment.

Furthermore coupled to the collective illumination beam path is the illumination beam path of a manipulator module 22 which likewise receives radiation from the laser module 15 via an optical fiber (not designated further here) and guides a point-shaped or line-shaped beam distribution over the sample 2 in a scanning fashion. The manipulator module 22 thus substantially corresponds to the illumination module of a laser scanning microscope, and as a consequence, the manipulator module 22 can also be operated in a manner combined with the detector of the laser scanning module 9 or the widefield detection of the CCD detector 6.

A grating 23, having a grating constant below the cut-off frequency that can be transferred with the microscope 1 into the sample 2, is furthermore provided in the collective illumination beam path 16. The grating 23 can be arranged for example in a plane (intermediate image of the sample) of the illumination beam path 16 that is imaged onto the sample. The grating 23 is displaceable transversely to the optical axis of the collective illumination beam path 16. To this end, a corresponding displacement drive 24 is provided.

An image field rotator 25, which is rotated by a rotator drive 26, is furthermore arranged in the collective illumination beam path 16 downstream of the grating in the illumination direction. The image field rotator can be for example an Abbe-Koenig prism.

The modules and the drives and also the detectors of the microscope 1 are all connected to a control device 28 via lines (not designated further here). This connection can be realized for example via a data and control bus. The control device 28 controls the microscope 1 in different operating modes.

The control device 28 thus permits the performance of classical microscopy, that is to say widefield microscopy (WF), laser scanning microscopy (LSM) and fluorescence microscopy with total internal reflection (TIRF), on the microscope 1.

The microscope in FIG. 1 has substantially two modules that are suitable for laser scanner illumination, specifically the laser scanning module 9 and the manipulator module 22. Other combinations are of course also possible. Said modules are coupled via tube lenses with the objective 3 onto the sample 2. The manipulator module 22 includes merely the excitation part of a laser scanning module, without detection. As a result, the sample can be illuminated in point-shaped fashion, and the illumination spot can be scanned over the sample 2.

Preferably, a switching unit, for example a switching lens or cylindrical lens, with which switching between point-shaped and line-shaped illumination is effected, is also located in the manipulator module 22. Said line-shaped illumination is advantageous in particular when the grating 23 is pivoted in and is located perpendicularly to the line of the line-shaped illumination. Alternatively, the line-shaped illumination could be used for the dynamic (sequential) generation of structured illumination in the sample 2.

A variably adjustable stripe modulator or a DMD or an SLM can also be used as an alternative to the grating 23 to produce structured illumination in the sample 2. In that case, the displacement drive 24 and the ability to pivot the grating 23 in and out are of course no longer necessary.

The image field rotator 25 permits the structured illumination that is produced by way of the grating 23 (or by the elements replacing the latter) to be rotated about the optical axis of the collective illumination beam path 16, such that the structured illumination lies at different angles in the sample 2.

To switch between individual operating types, the switching mirrors 18 and 11 and the beam splitter 4 are adjusted appropriately. In the realization, folding or tilting mirrors can be used to this end, such that switching between the operating types can be effected sequentially. Alternatively, dichroic mirrors that permit simultaneous operation of the various modules are also possible.

The beam splitter 4 is preferably embodied as a dichroic beam splitter, wherein the spectral properties are adjustable such that spectral components of fluorescence emission from labeling molecules that are to be detected with the aid of the CCD detector 6 pass into the widefield detection beam path 8, and the remaining spectral components are transmitted if possible. To increase the flexibility with respect to the utilizability of labeling molecules with different emission characteristics, a plurality of different beam splitters 4 and emission filters 13 are arranged in the beam splitter module 12 in a manner such that they are interchangeable, for example on a filter wheel.

The above-described microscope can serve to produce a super-resolved resulting image. To this end, the control device 28 has an appropriate configuration, for example by way of suitable programming.

Figure 2:
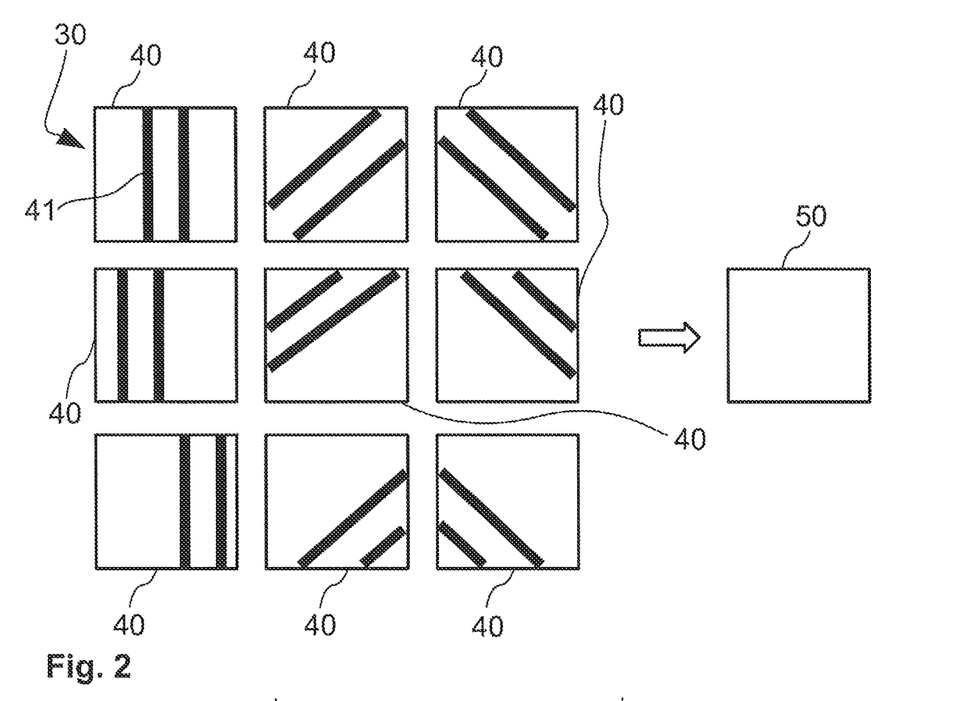
FIG. 2 schematically illustrates the principle of structured illumination in a plurality of phases.

FIG. 2 schematically illustrates the concept used to produce a super-resolved image with a single focal plane according to the SIM method. The sample under the microscope 1 in FIG. 1 is repeatedly imaged in widefield, wherein different illumination states are set.

FIG. 2 shows a set 30 of individual images 40 from a single focal plane, which differ in terms of a light structure 41 that they contain which is applied onto the sample using structured illumination via the illumination beam path 16. As can be seen, the lateral, for example periodic light structure 41 produced for example using the grating 23 is different in the different individual images 40. In total, the example includes nine individual images 40, which are made up of three different orientations of the structure 41 and three different displacement positions of the structure 41. The various orientations and displacement positions are grouped together under the term phases. Larger numbers of different phases are of course also possible, as is known from the publications cited above relating to the principle of SIM.

However, the structure 41 shown is to be understood to be purely an example. In particular, there is no need for it to be a line structure. It is also possible for the schematically drawn lines to be structured further along the lines. Rather than using the line-type structuring used in the initially cited SIM publications, it is equally possible to use scanned confocal point or line illumination with confocal detection, as is known from the publication "Image scanning microscopy" by C. Müller and J. Enderlein, Physical Review Letters, 104, 198101 (2010). This principle is referred to as ISM. In that case, there are of course not nine orientations of structured illumination but a suitable multiplicity of individual images obtained from scanning a sample. Each individual image 40 then corresponds to a specific scanning location, that is to say a specific scanning state during the scanning of the image.

The control unit 28 calculates a super-resolved resulting image 50 from the recorded individual images 40 in the manner described below.

The illumination pattern $I(x, y, z)$ is multiplied on account of the interaction with the sample 2 by the optical properties thereof $S(x, y, z)$, and convulsed with the detection PSF $H(x, y, z)$:

$$I_{em}(x,y,z,z_0) = \int dx' dy' dz' I(x',y',z') S(x',y',z_0-z') H(x-x',y-y',z+z') \quad (1),$$

wherein $z_0$ indicates the displacement of the sample relative to the Talbot pattern of the structured illumination and to the instantaneous focal plane, and z indicates the position of the instantaneous focal plane. By setting $z=0$:

$$I_{em}(x,y,z_0) = \int dx' dy' dz' I(x',y',z') S(x',y',z_0-z') H(x-x',y-y',z') \quad (2)$$

A Fourier transform with respect to x, y and z gives:

$$I_{em}^f(k_x,k_y,k_z) = \int dk_x' dk_y' dk_z' I^f(k_x',k_y',k_z') S^f(k_x-k_x',k_y-k_y',k_z) H^f(k_x,k_y,k_z-k_z') \quad (3)$$

Discrete equidistant sampling in the z-direction can be presented by the Dirac comb function (https://en.wikipedia.org/wiki/Dirac_comb):

$$IS_{em}(x, y, z) = \sum_{k=-\infty}^{+\infty} I_{em}(x, y, z) \delta(z - k\Delta z), \quad (4)$$

wherein $\Delta z$ indicates the sampling interval in the z-direction. The summation index k here in a concrete calculation runs over all axial sample planes for which a resulting image is to be ascertained, that is to say over a finite region of integers instead of the infinite series given here for the sake of completeness.

A Fourier transform of equation (4) with respect to x, y and z gives:

$$IS_{em}^f(k_x, k_y, k_z) = \sum_{k=-\infty}^{+\infty} I_{em}^f\left(k_x, k_y, k_z - \frac{k}{\Delta z}\right) \quad (5)$$

The Fourier transform of the Dirac comb of the period $\Delta z$ is here again a Dirac comb, but with the period $1/\Delta z$. However, the summation index k must not be confused here with the components $k_x$, $k_y$, $k_z$ of the wave vector in the frequency domain.

Inserting equation (3) in equation (5) gives a generally valid system of equations by means of which any Fourier-transformed illumination pattern if $(k_x', k_y', k_z')$ can be unmixed:

$$IS_{em}^f(k_x, k_y, k_z) = \quad (6)$$

$$\sum_{k=-\infty}^{+\infty} \int dk_x' dk_y' dk_z' I^f(k_x',k_y',k_z') S^f\left(k_x-k_x', k_y-k_y', k_z - \frac{k}{\Delta z}\right) H^f\left(k_x, k_y, k_z - \frac{k}{\Delta z} - k_z'\right)$$

As above, the infinite series should be replaced in a concrete calculation by a finite sum over the sample planes that are to be calculated.

The system of equations can be solved on the basis of the concretely used illumination pattern $I(x, y, z)$ in different illumination phases, more specifically on the basis of its Fourier transform $I^f(k_x, k_y, k_z)$, the detection PSF $H(x, y, z)$ of the microscope, more specifically on the basis of its Fourier transform $H^f(x, y, z)$ that is to say the OTF and the recorded individual images 40 or $IS_{em}$, $(x, y, z)$, more specifically on the basis of the Fourier transform $IS_{em}^f(k_x, k_y, k_z)$ of the recorded individual images 40.

Solving the system of equations brings about a separation of the illumination arrangements and a shift of the spatial frequency components that are not transferable per se by the OTF of the microscope but are contained in the individual images with structured illumination in a frequency-shifted form, to their original locations in the frequency domain.

The solutions are the Fourier transforms $$S^f\left(k_x - k_x', k_y - k_y', k_z - \frac{k}{\Delta z}\right)$$

of the optical properties of the sample. These also contain, on account of the interaction with the pattern of the illumination structure, higher frequency components than are optically transferable by the microscope 1. It is possible by way of inverse Fourier transforms to calculate therefrom a laterally and/or axially super-resolved resulting image for each recorded focal plane.

If a set 30 of individual images 40 is recorded with different illumination phases for each plane described by the system of equations, this corresponds to the conventional 3D-SIM. The system of equation is here completely determined or even overdetermined and is generally solved simultaneously for all planes described. Solving the system of equations can, in conjunction with the subsequent inverse Fourier transform, be considered as deconvolution because the convolution of the light emitted by the sample with the PSF of the microscope is substantially reversed.

However, it is not necessary at all to record a set 30 of individual images 40 for each plane described by the system of equations, and instead, one or more planes can be omitted. The system of equations is then seemingly underdetermined and the reconstruction problem is thus ill-posed. Nevertheless, it can be solved approximately such that even for the omitted plane(s) a reconstruction of the optical properties S(x, y, z) thereof and thus of a resulting image can be effected. This system of equations is also solved simultaneously across a plurality of focal planes.

An approximate solution is accomplished for example by way of linear regression in the frequency domain, in particular by way of regularization. In the simplest case, interpolation can be performed. Preferably, a truncated singular value decomposition is performed or deconvolution is effected under an SVD-based constraint.

Finer sampling transversely to the optical axis lateral oversampling by way of correspondingly small detector pixels produces additional independent measurement values that permit more stable regularization. For normal SIM, lateral oversampling would be redundant. However, equation (6) can be extended with oversampled additional pixels:

$$IS_{em}^f\left(k_x - \frac{i}{\Delta x}, k_y - \frac{j}{\Delta y}, k_z\right) = \sum_{k=-\infty}^{+\infty} \int dk_x' dk_y' dk_z' I^f(k_x', k_y', k_z') S^f\left(k_x - k_x', k_y - k_y', k_z - \frac{k}{\Delta z}\right) \times H^f\left(k_x - \frac{i}{\Delta x}, k_y - \frac{j}{\Delta y}, k_z - \frac{k}{\Delta z} - k_z'\right),$$ (7)

wherein i, j designate the additional pixels in the frequency domain and Δx, Δy indicate the sampling intervals transversely to the optical axis. This improves the accuracy of the approximate solution. A larger number of illumination phases alternatively or additionally to the lateral oversampling can also improve the accuracy of the solution. As above, the infinite series should be replaced in a concrete calculation by a finite sum over the sample planes that are to be calculated.

Figure 3:
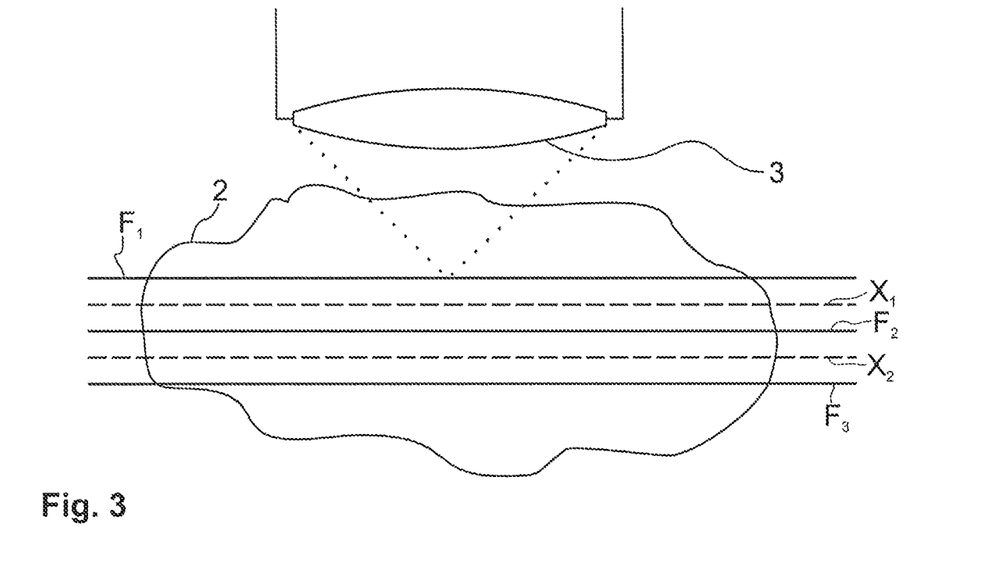
FIG. 3 illustrates a stack of focal planes to be recorded and additional sample planes.

FIG. 3 illustrates by way of example focal planes $F_1$, $F_2$ and $F_3$, which are situated in the sample 2. The focus of the objective 3 is successively set at these focal planes. For each focal plane, the sample 2 is illuminated in structured fashion for example with the illumination phases illustrated in FIG. 2. In each of the nine illumination phases, the instantaneous focal plane is recorded in diffraction-limited fashion in a respective one of the for example nine individual images. For three focal planes, 27 individual images are then present.

The focal planes $F_1$, $F_2$ and $F_3$ are arranged at a further distance from one another than permitted as per the Nyquist criterion. The distance from one another is exactly such that the depth-of-field ranges of the adjacent focal planes $F_1$ and $F_2$ and focal planes $F_2$ and $F_3$ still overlap. Between the focal planes $F_1$, $F_2$ and $F_3$, the sample has ("additional") sample planes $X_1$ and $X_2$, of which no focused individual images are recorded. Intensities from these planes are only detected out of focus in the individual images from the focal planes $F_1$, $F_2$ and $F_3$. The additional sample planes $X_1$ and $X_2$ are arranged spaced apart from their adjacent focal planes such that the focal planes $F_1$, $F_2$ and $F_3$ together with the additional sample planes $X_1$ and $X_2$ meet the Nyquist criterion, for example all five planes are arranged equidistantly.

By way of approximately solving the system of equations (6) with the respective illumination phases in the three focal planes $F_1$, $F_2$ and $F_3$ and the two additional sample planes $X_1$ and $X_2$, it is possible to calculate five super-resolved resulting images 50 in each case one resulting image for each focal plane and for each additional sample plane. For the approximate solution, the system of equations (6) is for example initially regularized using a truncated singular value decomposition and then solved.

Figure 4:
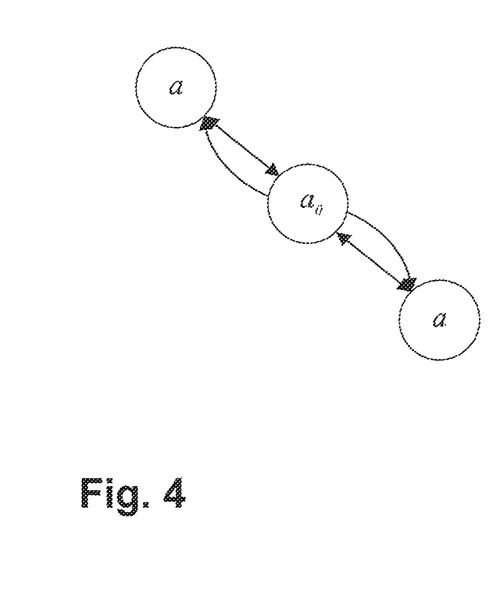
FIG. 4 shows illumination with three interfering orders.
Figure 5:
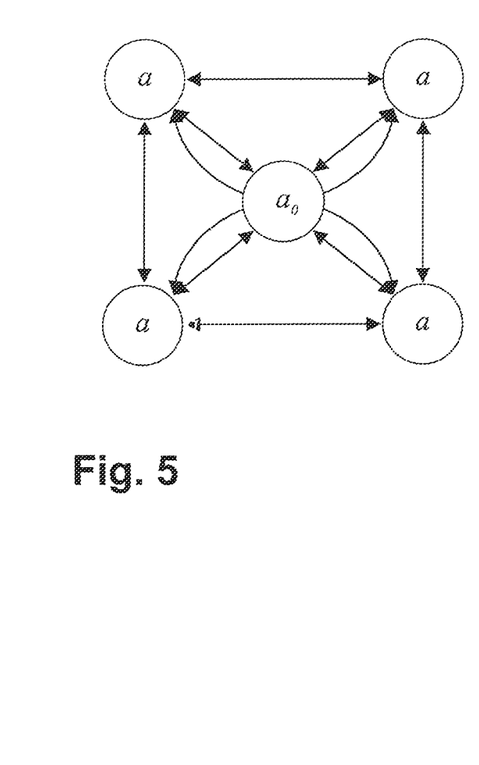
FIG. 5 shows illumination with five interfering orders.

Two possible concrete illumination patterns/(x, y, z) are illustrated by FIG. 4 and FIG. 5. The three beams shown in FIG. 4 in the rear focal plane of the objective 3 produce in the sample in the focal plane a grid pattern of parallel stripes that repeats axially on account of the Talbot effect in further planes:

$$I(x,y,z) = a_0^2/2 + a^2 + a^2 \cos(2*\hat{k}_x x + 2*\hat{k}_y y + \varphi_{-11}) + 2*a a_0 \cos(\hat{k}_x x + \hat{k}_y y + \varphi_{01}) * \cos((\hat{k} - \hat{k}_z)z - \varphi_0)$$ (8), wherein $a_0$ indicates the intensity of the central beam and a indicates the intensity of the other beams. $\hat{k}_x$, $\hat{k}_y$ are the x- and y-components of the grid produced, $\hat{k}_z$ corresponds to the Talbot frequency, $\varphi_0$ is the phase of the Talbot pattern (the displacement of the Talbot pattern in relation to the focal plane), and $\varphi_{ij}$ are the phases of the grid produced transversely to the optical axis for pair-wise interference of the various beams.

Insertion in the equation (3) results in:

$$I_{em}^f(k_x,k_y,k_z) = A_0 H^f(k_x,k_y,k_z) S^f(k_x,k_y,k_z) + A_2 H^f(k_x,k_y,k_z)\{S^f(k_x+2*\hat{k}_x,k_y+2*\hat{k}_y,k_z)e^{-i2\varphi_{-11}} + S^f(k_x-2*\hat{k}_x,k_y-2*\hat{k}_y,k_z)e^{i2\varphi_{-11}}\} + A_1\{H^f(k_x,k_y,k_z+[\hat{k}_z-\hat{k}])e^{i\varphi_0} + H^f(k_x,k_y,k_z-[\hat{k}_z-\hat{k}])e^{-i\varphi_0}\} S^f(k_x+\hat{k}_x,k_y+\hat{k}_y,k_z)e^{-i\varphi_{01}} + A_1\{H^f(k_x,k_y,k_z+[\hat{k}_z-\hat{k}])e^{i\varphi_0} + H^f(k_x,k_y,k_z-[\hat{k}_z-\hat{k}])e^{-i\varphi_0}\} S^f(k_x+\hat{k}_x,k_y+\hat{k}_y,k_z)e^{-\varphi_{01}}$$ (9), wherein $A_n$, n=0 ... 2 are the corresponding intensities of the orders. The result of this is five intensity components to be separated in the frequency domain. Five individual images from five different illumination phases φ are required herefor.

The equations (6) and (7) in this illumination pattern take on the following forms (as above, the infinite series should, in a concrete calculation, be replaced by a finite sum over the sample planes to be calculated):

$$IS_{em}^f(k_x, k_y, k_z) = A_0 \sum_{k=-\infty}^{\infty} H^f\left(k_x, k_y, k_z - \frac{k}{\Delta z}\right) S^f\left(k_x, k_y, k_z - \frac{k}{\Delta z}\right) + e^{-i2\varphi_{-11}} A_2 \sum_{k=-\infty}^{\infty} H^f\left(k_x, k_y, k_z - \frac{k}{\Delta z}\right) S^f\left(k_x + 2*\hat{k}_x, k_y + 2*\hat{k}_y, k_z - \frac{k}{\Delta z}\right) + e^{i2\varphi_{-11}} A_2 \sum_{k=-\infty}^{\infty} H^f\left(k_x, k_y, k_z - \frac{k}{\Delta z}\right) S^f\left(k_x - 2*\hat{k}_x, k_y - 2*\hat{k}_y, k_z - \frac{k}{\Delta z}\right) +$$ (10)

-continued $$e^{-i\varphi_{01}} e^{i\varphi_0} A_1 \sum_{k=-\infty}^{\infty} H^f\left(k_x, k_y, k_z + [\hat{k}_z - \hat{k}] - \frac{k}{\Delta z}\right)$$

$$S^f\left(k_x + \hat{k}_x, k_y + \hat{k}_y, k_z - \frac{k}{\Delta z}\right) + e^{-i\varphi_{01}} e^{-i\varphi_0} A_1$$

$$\sum_{k=-\infty}^{\infty} H^f\left(k_x, k_y, k_z - [\hat{k}_z - \hat{k}] - \frac{k}{\Delta z}\right) S^f\left(k_x + \hat{k}_x, k_y + \hat{k}_y, k_z - \frac{k}{\Delta z}\right) +$$

$$e^{i\varphi_{01}} e^{i\varphi_0} A_1 \sum_{k=-\infty}^{\infty} H^f\left(k_x, k_y, k_z + [\hat{k}_z - \hat{k}] - \frac{k}{\Delta z}\right)$$

$$S^f\left(k_x - \hat{k}_x, k_y - \hat{k}_y, k_z - \frac{k}{\Delta z}\right) + e^{i\varphi_{01}} e^{-i\varphi_0} A_1$$

$$\sum_{k=-\infty}^{\infty} H^f\left(k_x, k_y, k_z - [\hat{k}_z - \hat{k}] - \frac{k}{\Delta z}\right) S^f\left(k_x - \hat{k}_x, k_y - \hat{k}_y, k_z - \frac{k}{\Delta z}\right)$$

(11)

$$IS_{em}^f\left(k_x - \frac{i}{\Delta x}, k_y - \frac{j}{\Delta y}, k_z\right) =$$

$$A_0 \sum_{k=-\infty}^{\infty} H^f\left(k_x - \frac{i}{\Delta x}, k_y - \frac{j}{\Delta y}, k_z - \frac{k}{\Delta z}\right) S^f\left(k_x, k_y, k_z - \frac{k}{\Delta z}\right) +$$

$$e^{-i2\varphi_{-11}} A_2 \sum_{k=-\infty}^{\infty} H^f\left(k_x - \frac{i}{\Delta x}, k_y - \frac{j}{\Delta y}, k_z - \frac{k}{\Delta z}\right)$$

$$S^f\left(k_x + 2*\hat{k}_x, k_y + 2*\hat{k}_y, k_z - \frac{k}{\Delta z}\right) +$$

$$e^{i2\varphi_{-11}} A_2 \sum_{k=-\infty}^{\infty} H^f\left(k_x - \frac{i}{\Delta x}, k_y - \frac{j}{\Delta y}, k_z - \frac{k}{\Delta z}\right)$$

$$S^f\left(k_x - 2*\hat{k}_x, k_y - 2*\hat{k}_y, k_z - \frac{k}{\Delta z}\right) +$$

$$e^{-i\varphi_{01}} e^{i\varphi_0} A_1 \sum_{k=-\infty}^{\infty} H^f\left(k_x - \frac{i}{\Delta x}, k_y - \frac{j}{\Delta y}, k_z + [\hat{k}_z - \hat{k}] - \frac{k}{\Delta z}\right)$$

$$S^f\left(k_x + \hat{k}_x, k_y + \hat{k}_y, k_z - \frac{k}{\Delta z}\right) +$$

$$e^{-i\varphi_{01}} e^{-i\varphi_0} A_1 \sum_{k=-\infty}^{\infty} H^f\left(k_x - \frac{i}{\Delta x}, k_y - \frac{j}{\Delta y}, k_z - [\hat{k}_z - \hat{k}] - \frac{k}{\Delta z}\right)$$

$$S^f\left(k_x + \hat{k}_x, k_y + \hat{k}_y, k_z - \frac{k}{\Delta z}\right) +$$

$$e^{i\varphi_{01}} e^{i\varphi_0} A_1 \sum_{k=-\infty}^{\infty} H^f\left(k_x - \frac{i}{\Delta x}, k_y - \frac{j}{\Delta y}, k_z + [\hat{k}_z - \hat{k}] - \frac{k}{\Delta z}\right)$$

$$S^f\left(k_x - \hat{k}_x, k_y - \hat{k}_y, k_z - \frac{k}{\Delta z}\right) +$$

$$e^{i\varphi_{01}} e^{-i\varphi_0} A_1 \sum_{k=-\infty}^{\infty} H^f\left(k_x - \frac{i}{\Delta x}, k_y - \frac{j}{\Delta y}, k_z - [\hat{k}_z - \hat{k}] - \frac{k}{\Delta z}\right)$$

$$S^f\left(k_x - \hat{k}_x, k_y - \hat{k}_y, k_z - \frac{k}{\Delta z}\right)$$

The five beams shown in FIG. 5 in the rear focal plane of the objective 3 produce in the sample in the focal plane a two-dimensional grid pattern that repeats axially on account of the Talbot effect in further planes:

$$I(x,y,z) = a_0^2/2 + 2*a^2 + 2*a^2 \cos(2*\hat{k}_y y + \varphi_{21}) + 2*aa_0 \cos(\hat{k}_x x + \hat{k}_y y + \varphi_{20})*\cos((\hat{k} - \hat{k}_z)z - \varphi_0) + 2*a^2 \cos(2*\hat{k}_x x + \varphi_{-21}) + a^2 \cos(2*\hat{k}_x x + 2*\hat{k}_y y + \varphi_{22}) + 2*aa_0 \cos(\hat{k}_x x - \hat{k}_y y + \varphi_{10})*\cos((\hat{k} - \hat{k}_z)z - \varphi_0) + a^2 \cos(2*\hat{k}_x x - 2*\hat{k}_y y + \varphi_{-11})$$

(12)

The variables have the same meaning as in equation (8).

Insertion in equation (3) results in:

$$I_{em}^f(k_x, k_y, k_z) = A_0 H^f(k_x, k_y, k_z) S^f(k_x, k_y, k_z) + \tag{13}$$

$$A_1 H^f(k_x, k_y, k_z) \left\{ \begin{array}{l} S^f(k_x, k_y + 2*\hat{k}_y, k_z) e^{-i2\varphi_{21}} + \\ S^f(k_x, k_y - 2*\hat{k}_y, k_z) e^{i2\varphi_{21}} \end{array} \right\} +$$

$$A_2 \{H^f(k_x, k_y, k_z + [\hat{k}_z - \hat{k}]) e^{i\varphi_0} + H^f(k_x, k_y, k_z - [\hat{k}_z - \hat{k}]) e^{-i\varphi_0}\} +$$

$$S^f(k_x + \hat{k}_x, k_y + \hat{k}_y, k_z) e^{-i\varphi_{20}} +$$

$$A_2 \{H^f(k_x, k_y, k_z + [\hat{k}_z - \hat{k}]) e^{i\varphi_0} + H^f(k_x, k_y, k_z - [\hat{k}_z - \hat{k}]) e^{-i\varphi_0}\}$$

$$S^f(k_x - \hat{k}_x, k_y - \hat{k}_y, k_z) e^{i\varphi_{20}} +$$

$$A_3 H^f(k_x, k_y, k_z) \left\{ \begin{array}{l} S^f(k_x + 2*\hat{k}_x, k_y, k_z) e^{-i2\varphi_{-21}} + \\ S^f(k_x + 2*\hat{k}_x, k_y, k_z) e^{i2\varphi_{-21}} \end{array} \right\} +$$

$$A_4 H^f(k_x, k_y, k_z) \{S^f(k_x + 2*\hat{k}_x, k_y + 2*\hat{k}_y, k_z) e^{-i2\varphi_{-22}} +$$

$$S^f(k_x - 2*\hat{k}_x, k_y - 2*\hat{k}_y, k_z) e^{i2\varphi_{-22}}\} +$$

$$A_5 \{H^f(k_x, k_y, k_z + [\hat{k}_z - \hat{k}]) e^{i\varphi_0} + H^f(k_x, k_y, k_z - [\hat{k}_z - \hat{k}]) e^{-i\varphi_0}\}$$

$$S^f(k_x + \hat{k}_x, k_y - \hat{k}_y, k_z) e^{-i\phi_{10}} +$$

$$A_5 \{H^f(k_x, k_y, k_z + [\hat{k}_z - \hat{k}]) e^{i\varphi_0} + H^f(k_x, k_y, k_z - [\hat{k}_z - \hat{k}]) e^{-i\varphi_0}\}$$

$$S^f(k_x - \hat{k}_x, k_y + \hat{k}_y, k_z) e^{i\varphi_{10}} +$$

$$A_6 H^f(k_x, k_y, k_z) \{S^f(k_x + 2*\hat{k}_x, k_y - 2*\hat{k}_y, k_z) e^{-i2\varphi_{-11}} +$$

$$S^f(k_x - 2*\hat{k}_x, k_y + 2*\hat{k}_y, k_z) e^{i2\varphi_{-11}}\}$$

wherein $A_n$, n=0 . . . 6 are the corresponding intensities of the orders. The result of this is thirteen intensity components to be separated in the frequency domain. Thirteen individual images from thirteen different illumination phases φ are required herefor.

The equations (6) and (7) in this illumination pattern take on the following forms (as above, the infinite series should, in a concrete calculation, be replaced by a finite sum over the sample planes to be calculated):

(14)

$$IS_{em}^f(k_x, k_y, k_z) = A_0 \sum_{k=-\infty}^{\infty} H^f\left(k_x, k_y, k_z - \frac{k}{\Delta z}\right) S^f\left(k_x, k_y, k_z - \frac{k}{\Delta z}\right) +$$

$$e^{-i2\varphi_{21}} A_1 \sum_{k=-\infty}^{\infty} H^f\left(k_x, k_y, k_z - \frac{k}{\Delta z}\right) S^f\left(k_x, k_y + 2*\hat{k}_y, k_z - \frac{k}{\Delta z}\right) +$$

$$e^{i2\varphi_{12}} A_1 \sum_{k=-\infty}^{\infty} H^f\left(k_x, k_y, k_z - \frac{k}{\Delta z}\right) S^f\left(k_x, k_y - 2*\hat{k}_y, k_z - \frac{k}{\Delta z}\right) +$$

$$e^{-i\varphi_{20}} e^{i\varphi_0} A_2 \sum_{k=-\infty}^{\infty} H^f\left(k_x, k_y, k_z + [\hat{k}_z - \hat{k}] - \frac{k}{\Delta z}\right)$$

$$S^f\left(k_x + \hat{k}_x, k_y + \hat{k}_y, k_z - \frac{k}{\Delta z}\right) + e^{-i\varphi_{20}} e^{-i\varphi_0} A_2$$

$$\sum_{k=-\infty}^{\infty} H^f\left(k_x, k_y, k_z - [\hat{k}_z - \hat{k}] - \frac{k}{\Delta z}\right) S^f\left(k_x + \hat{k}_x, k_y + \hat{k}_y, k_z - \frac{k}{\Delta z}\right) +$$

$$e^{i\varphi_{20}} e^{i\varphi_0} A_2 \sum_{k=-\infty}^{\infty} H^f\left(k_x, k_y, k_z + [\hat{k}_z - \hat{k}] - \frac{k}{\Delta z}\right)$$

$$S^f\left(k_x - \hat{k}_x, k_y - \hat{k}_y, k_z - \frac{k}{\Delta z}\right) + e^{i\varphi_{20}} e^{-i\varphi_0} A_2$$

$$\sum_{k=-\infty}^{\infty} H^f\left(k_x, k_y, k_z - [\hat{k}_z - \hat{k}] - \frac{k}{\Delta z}\right) S^f\left(k_x - \hat{k}_x, k_y - \hat{k}_y, k_z - \frac{k}{\Delta z}\right) +$$

-continued $$e^{-i2\varphi_{-21}} A_3 \sum_{k=-\infty}^{\infty} H^f\left(k_x, k_y, k_z - \frac{k}{\Delta z}\right) S^f\left(k_x + 2*\hat{k}_x, k_y, k_z - \frac{k}{\Delta z}\right) +$$

$$e^{i2\varphi_{-21}} A_3 \sum_{k=-\infty}^{\infty} H^f\left(k_x, k_y, k_z - \frac{k}{\Delta z}\right) S^f\left(k_x, -2*\hat{k}_x, k_y, k_z - \frac{k}{\Delta z}\right) +$$

$$e^{-i2\varphi_{-22}} A_4$$

$$\sum_{k=-\infty}^{\infty} H^f\left(k_x, k_y, k_z - \frac{k}{\Delta z}\right) S^f\left(k_x + 2*\hat{k}_x, k_y, +2*\hat{k}_y, k_z - \frac{k}{\Delta z}\right) +$$

$$e^{i2\varphi_{-22}} A_4 \sum_{k=-\infty}^{\infty} H^f\left(k_x, k_y, k_z - \frac{k}{\Delta z}\right)$$

$$S^f\left(k_x - 2*\hat{k}_x, k_y + 2*\hat{k}_y, k_z - \frac{k}{\Delta z}\right) + e^{-i\varphi_{10}} e^{i\varphi_0} A_5$$

$$\sum_{k=-\infty}^{\infty} H^f\left(k_x, k_y, k_z + [\hat{k}_z - \hat{k}] - \frac{k}{\Delta z}\right) S^f\left(k_x + \hat{k}_x, k_y - \hat{k}_y, k_z - \frac{k}{\Delta z}\right) +$$

$$e^{-i\varphi_{10}} e^{-i\varphi_0} A_5 \sum_{k=-\infty}^{\infty} H^f\left(k_x, k_y, k_z - [\hat{k}_z - \hat{k}] - \frac{k}{\Delta z}\right)$$

$$S^f\left(k_x + \hat{k}_x, k_y - \hat{k}_y, k_z - \frac{k}{\Delta z}\right) + e^{i\varphi_{10}} e^{i\varphi_0} A_5$$

$$\sum_{k=-\infty}^{\infty} H^f\left(k_x, k_y, k_z + [\hat{k}_z - \hat{k}] - \frac{k}{\Delta z}\right) S^f\left(k_x - \hat{k}_x, k_y + \hat{k}_y, k_z - \frac{k}{\Delta z}\right) +$$

$$e^{i\varphi_{10}} e^{-i\varphi_0} A_5 \sum_{k=-\infty}^{\infty} H^f\left(k_x, k_y, k_z - [\hat{k}_z - \hat{k}] - \frac{k}{\Delta z}\right)$$

$$S^f\left(k_x - \hat{k}_x, k_y + \hat{k}_y, k_z - \frac{k}{\Delta z}\right) + e^{-i2\varphi_{-11}} A_6$$

$$\sum_{k=-\infty}^{\infty} H^f\left(k_x, k_y, k_z - \frac{k}{\Delta z}\right) S^f\left(k_x + 2*\hat{k}_x, k_y - 2*\hat{k}_y, k_z - \frac{k}{\Delta z}\right) +$$

$$e^{i2\varphi_{-11}} A_6 \sum_{k=-\infty}^{\infty} H^f\left(k_x, k_y, k_z - \frac{k}{\Delta z}\right) S^f\left(k_x - 2*\hat{k}_x, k_y + 2*\hat{k}_y, k_z - \frac{k}{\Delta z}\right)$$

(15)

$$IS_{em}^f\left(k_x - \frac{i}{\Delta x}, k_y - \frac{j}{\Delta y}, k_z\right) =$$

$$A_0 \sum_{k=-\infty}^{\infty} H^f\left(k_x - \frac{i}{\Delta x}, k_y - \frac{j}{\Delta y}, k_z - \frac{k}{\Delta z}\right) S^f\left(k_x, k_y, k_z - \frac{k}{\Delta z}\right) +$$

$$e^{-i2\varphi_{21}} A_1 \sum_{k=-\infty}^{\infty} H^f\left(k_x - \frac{i}{\Delta x}, k_y - \frac{j}{\Delta y}, k_z - \frac{k}{\Delta z}\right)$$

$$S^f\left(k_x, k_y + 2*\hat{k}_y, k_z - \frac{k}{\Delta z}\right) + e^{i2\varphi_{21}} A_1$$

$$\sum_{k=-\infty}^{\infty} H^f\left(k_x - \frac{i}{\Delta x}, k_y - \frac{j}{\Delta y}, k_z - \frac{k}{\Delta z}\right) S^f\left(k_x, k_y - 2*\hat{k}_y, k_z - \frac{k}{\Delta z}\right) +$$

$$e^{-i\varphi_{20}} e^{i\varphi_0} A_2 \sum_{k=-\infty}^{\infty} H^f\left(k_x - \frac{i}{\Delta x}, k_y - \frac{j}{\Delta y}, k_z + [\hat{k}_z - \hat{k}] - \frac{k}{\Delta z}\right)$$

$$S^f\left(k_x + \hat{k}_x, k_y + \hat{k}_y, k_z - \frac{k}{\Delta z}\right) +$$

$$e^{-i\varphi_{20}} e^{-i\varphi_0} A_2 \sum_{k=-\infty}^{\infty} H^f\left(k_x - \frac{i}{\Delta x}, k_y - \frac{j}{\Delta y}, k_z - [\hat{k}_z - \hat{k}] - \frac{k}{\Delta z}\right)$$

$$S^f\left(k_x + \hat{k}_x, k_y + \hat{k}_y, k_z - \frac{k}{\Delta z}\right) +$$

$$e^{i\varphi_{20}} e^{i\varphi_0} A_2 \sum_{k=-\infty}^{\infty} H^f\left(k_x - \frac{i}{\Delta x}, k_y - \frac{j}{\Delta y}, k_z + [\hat{k}_z - \hat{k}] - \frac{k}{\Delta z}\right)$$

$$S^f\left(k_x - \hat{k}_x, k_y - \hat{k}_y, k_z - \frac{k}{\Delta z}\right) +$$

$$e^{i\varphi_{20}} e^{-i\varphi_0} A_2 \sum_{k=-\infty}^{\infty} H^f\left(k_x - \frac{i}{\Delta x}, k_y - \frac{j}{\Delta y}, k_z - [\hat{k}_z - \hat{k}] - \frac{k}{\Delta z}\right)$$

$$S^f\left(k_x - \hat{k}_x, k_y - \hat{k}_y, k_z - \frac{k}{\Delta z}\right) + e^{-i2\varphi_{-21}} A_3$$

$$\sum_{k=-\infty}^{\infty} H^f\left(k_x - \frac{i}{\Delta x}, k_y - \frac{j}{\Delta y}, k_z - \frac{k}{\Delta z}\right) S^f\left(k_x + 2*\hat{k}_x, k_y, k_z - \frac{k}{\Delta z}\right) +$$

$$e^{i2\varphi_{-21}} A_3 \sum_{k=-\infty}^{\infty} H^f\left(k_x - \frac{i}{\Delta x}, k_y - \frac{j}{\Delta y}, k_z - \frac{k}{\Delta z}\right)$$

$$S^f\left(k_x - 2*\hat{k}_x, k_y, k_z - \frac{k}{\Delta z}\right) +$$

$$e^{-i2\varphi_{-22}} A_4 \sum_{k=-\infty}^{\infty} H^f\left(k_x - \frac{i}{\Delta x}, k_y - \frac{j}{\Delta y}, k_z - \frac{k}{\Delta z}\right) S^f$$

$$\left(k_x + 2*\hat{k}_x, k_y + 2*\hat{k}_y, k_z - \frac{k}{\Delta z}\right) +$$

$$e^{i2\varphi_{-22}} A_4 \sum_{k=-\infty}^{\infty} H^f\left(k_x - \frac{i}{\Delta x}, k_y - \frac{j}{\Delta y}, k_z - \frac{k}{\Delta z}\right) S^f$$

$$\left(k_x - 2*\hat{k}_x, k_y - 2*\hat{k}_y, k_z - \frac{k}{\Delta z}\right) +$$

$$e^{-i2\varphi_{10}} e^{i\varphi_0} A_5 \sum_{k=-\infty}^{\infty} H^f\left(k_x - \frac{i}{\Delta x}, k_y - \frac{j}{\Delta y}, k_z + [\hat{k}_z - \hat{k}] - \frac{k}{\Delta z}\right)$$

$$S^f\left(k_x + \hat{k}_x, k_y - \hat{k}_y, k_z - \frac{k}{\Delta z}\right) +$$

$$e^{-i\varphi_{10}} e^{-i\varphi_0} A_5 \sum_{k=-\infty}^{\infty} H^f\left(k_x - \frac{i}{\Delta x}, k_y - \frac{j}{\Delta y}, k_z - [\hat{k}_z - \hat{k}] - \frac{k}{\Delta z}\right)$$

$$S^f\left(k_x + \hat{k}_x, k_y - \hat{k}_y, k_z - \frac{k}{\Delta z}\right) +$$

$$e^{i\varphi_{10}} e^{i\varphi_0} A_5 \sum_{k=-\infty}^{\infty} H^f\left(k_x - \frac{i}{\Delta x}, k_y - \frac{j}{\Delta y}, k_z + [\hat{k}_z - \hat{k}] - \frac{k}{\Delta z}\right)$$

$$S^f\left(k_x - \hat{k}_x, k_y + \hat{k}_y, k_z - \frac{k}{\Delta z}\right) +$$

$$e^{i\varphi_{10}} e^{-i\varphi_0} A_5 \sum_{k=-\infty}^{\infty} H^f\left(k_x - \frac{i}{\Delta x}, k_y - \frac{j}{\Delta y}, k_z - [\hat{k}_z - \hat{k}] - \frac{k}{\Delta z}\right)$$

$$S^f\left(k_x - \hat{k}_x, k_y + \hat{k}_y, k_z - \frac{k}{\Delta z}\right) +$$

$$e^{-i2\varphi_{-11}} A_6 \sum_{k=-\infty}^{\infty} H^f\left(k_x - \frac{i}{\Delta x}, k_y - \frac{j}{\Delta y}, k_z - \frac{k}{\Delta z}\right)$$

$$S^f\left(k_x + 2*\hat{k}_x, k_y - 2*\hat{k}_y, k_z - \frac{k}{\Delta z}\right) +$$

$$e^{i2\varphi_{-11}} A_6 \sum_{k=-\infty}^{\infty} H^f\left(k_x - \frac{i}{\Delta x}, k_y - \frac{j}{\Delta y}, k_z - \frac{k}{\Delta z}\right)$$

$$S^f\left(k_x - 2*\hat{k}_x, k_y + 2*\hat{k}_y, k_z - \frac{k}{\Delta z}\right)$$

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Microscope
2 Sample
3 Objective
4 Beam splitter
5 Tube lens
6 CCD detector
7 Light microscope module
8 Widefield detection beam path
9 Laser scanning module
11 Switching mirror
12 Beam splitter module
13 Emission filter
14 Optical fiber
15 Laser module
16 Collective illumination beam path
17 Widefield illumination module
18 Switching mirror 18
19 TIRF illumination module
20 Optical fiber
21 Mirror
22 Manipulator module
23 Grating
24 Displacement drive
25 Image field rotator
26 Rotator drive
27 Tube lens
28 Control device
30 Set of individual images
40 Individual image
41 Illumination structure
50 Resulting image
$F_i$ Focal planes
$X_i$ Additional sample planes

What is claimed is:

1. Method for imaging a sample using a microscope comprising, focusing a first focal plane of the sample using the microscope, illuminating said first focal plane in a plurality of phases sequentially with structured illumination light, recording sample light emitted or scattered by the sample per phase using a detector in a respective individual image, such that a resulting image having increased resolution is able to be reconstructed from the individual images, using said microscope to focus a second focal plane, different from the first focal plane, recording individual images in different illumination phases for said second focal plane, and reconstructing a resulting image from the individual images of the first and second focal planes, which resulting image represents a sample plane located between said focal planes.

2. Method according to claim 1, wherein a distance between the first and second focal planes between which the sample plane is situated is selected to be greater than half a minimum axial distance that is optically resolvable by the microscope.

3. Method according to claim 1, wherein a distance between the first and second focal planes between which the sample plane is situated is selected to be shorter than a minimum axial distance that is optically resolvable by the microscope.

4. Method according to claim 1, wherein at least one solution of a system of equations describing interaction of light structure with optical properties of the sample and with a point spread function of the microscope both in the first and second focal planes and in the sample plane that is situated between the first and second focal planes is approximately ascertained.

5. Method according to claim 4, wherein the following system of equations, or a mathematically equivalent system of equations, is used:

$$IS_{em}^f(k_x, k_y, k_z) = \sum_k \int dk'_x dk'_y dk'_z I^f(k'_x, k'_y, k'_z) S^f\left(k_x - k'_x, k_y - k'_y, k_z - \frac{k}{\Delta z}\right) H^f\left(k_x, k_y, k_z - \frac{k}{\Delta z} - k'_z\right);$$

wherein:
$k_x$, $k_y$, $k_z$ are components of a wave vector in the frequency domain;
$I^f(k_x, k_y, k_z)$ is a Fourier transform of the illumination pattern;
$S^f(k_x-k'_x, k_y-k'_y, k_z-k/\Delta z)$ are Fourier transforms of the optical properties of the sample;
$H^f(x, y, z)$ is a Fourier transform of the detection PSF;
$IS_{em}^f(k_x, k_y, k_z)$ is a Fourier transform of the recorded individual images;
i, j designate additional pixels in the frequency domain;
$\Delta x$, $\Delta y$ indicate the sampling intervals transversely to the optical axis;
$\Delta z$ indicates the sampling interval in the z-direction; and
k is a summation index.

6. Method according to claim 2, wherein, for an approximate solution, a linear regression, or a regularization, is used, in a truncated singular value decomposition in which only a real subset of all singular values is ascertained.

7. Method according to claim 1, wherein the individual images are optically oversampled laterally.

8. Method according to claim 7, wherein at least one solution of the following system of equations, or of a mathematically equivalent system of equations, is ascertained $$IS_{em}^f\left(k_x - \frac{i}{\Delta x}, k_y - \frac{j}{\Delta y}, k_z\right) = \sum_k \int dk'_x dk'_y dk'_z I^f(k'_x, k'_y, k'_z) S^f\left(k_x - k'_x, k_y - k'_y, k_z - \frac{k}{\Delta z}\right) \times H^f\left(k_x - \frac{i}{\Delta x}, k_y - \frac{j}{\Delta y}, k_z - \frac{k}{\Delta z} - k'_z\right);$$

wherein:
$k_x$, $k_y$, $k_z$ are components of a wave vector in the frequency domain;
$I^f(k_x, k_y, k_z)$ is a Fourier transform of the illumination pattern;
$S^f(k_x-k'_x, k_y-k'_y, k_z-k/\Delta z)$ are Fourier transforms of the optical properties of the sample;
$H^f(x, y, z)$ is a Fourier transform of the detection PSF;
$IS_{em}^f(k_x, k_y, k_z)$ is a Fourier transform of the recorded individual images;
i, j designate additional pixels in the frequency domain;
$\Delta x$, $\Delta y$ indicate the sampling intervals transversely to the optical axis;
$\Delta z$ indicates the sampling interval in the z-direction; and
k is a summation index.

9. Method according to claim 1, wherein a light structure produced in the sample is regularly structured.

10. Method according to claim 1, wherein the resulting image that represents the sample plane that is situated between the focal planes is reconstructed with a resolution that is increased as compared to the individual images.

11. Method according to claim 1, wherein the individual images or the resulting image is/are approximately deconvolved on a basis of a model of a point spread function of the microscope.

12. Method according to claim 9, wherein, in the deconvolution, a portion of one of the individual images is assigned to different resulting images.

13. Method according to claim 10, wherein, in the deconvolution, an portion of one of the individual images is assigned partially to at least one of the resulting images that represents one of the focal planes and partially to the resulting image which represents the sample plane that is situated between the focal planes.

14. Method according to claim 10, wherein an assignment to the resulting image that represents the sample plane that is situated between the focal planes is accomplished on a basis of intensities of individual images of at least the two nearest focal planes.

15. Method according to claim 1, wherein a two-dimensionally spatially resolving detector is used to record the individual images.

16. Method according to claim 1, wherein a point spread function of the microscope is not manipulated for producing an axial asymmetry.

17. Method according to claim 1, wherein during the recording of each of the individual images only exactly one focal plane is focused using the microscope.

18. A microscope comprising a control unit configured for performing a method according to claim 1, and also comprising a light source, means for focusing different focal planes in a sample, a two-dimensionally spatially resolving detector for recording individual images of an instantaneous focal plane, and means for producing structured illumination light in the sample, wherein no stop that optically sections the sample is arranged in front of the detector and without manipulating a point spread function of the microscope for producing an axial asymmetry.

19. Method according to claim 3, wherein, for an approximate solution, a linear regression, or a regularization, is used, in a truncated singular value decomposition in which only a real subset of all singular values is ascertained.

20. Method according to claim 11, wherein an assignment to the resulting image that represents the sample plane that is situated between the focal planes is accomplished on a basis of intensities of individual images of at least the two nearest focal planes.

21. Method according to claim 7, wherein said individual images are recorded with a resolution that is twice as fine as the optical resolution of the optical system of the microscope.

22. Method according to claim 9, wherein the light structure produced in the sample has a lateral periodicity or an axial periodicity and is arranged at a different position or in a different orientation in each of the illumination phases.

23. Method according to claim 11, wherein the individual images or the resulting image is/are approximately deconvolved after separating the illumination phases by calculation.

24. Method according to claim 12, wherein, in the deconvolution exactly one pixel is assigned to different resulting images.

25. Method according to claim 13, wherein, in the deconvolution, exactly one pixel is assigned partially to at least one of the resulting images that represents one of the focal planes and partially to the resulting image which represents the sample plane that is situated between the focal planes.

26. Method according to claim 15, wherein no stop that optically sections the sample is arranged in front of the detector.

* * * * *

UNITED STATES PATENT AND TRADEMARK OFFICE
CERTIFICATE OF CORRECTION

PATENT NO. : 11,221,297 B2  
APPLICATION NO. : 16/676762  
DATED : January 11, 2022  
INVENTOR(S) : Ingo Kleppe and Yauheni Novikau Page 1 of 3

It is certified that error appears in the above-identified patent and that said Letters Patent is hereby corrected as shown below:

On the Title Page

Item (57) In the Abstract:  
Line 9      now reads: "individual images to produce a super-resolved image stack,"  
         should read -- individual images to produce a super-resolved image stack. --

In the Specification

Column 9, Line 63      now reads: "$I_{em}^f(k_x,k_y,k_z) - \int dk_x'dk_y'dk_z'^{if}(k_x',k_y',k_z)S^f(k_x - k_x',k_y - k_y',$"  
         should read -- $I_{em}^f(k_x, k_y, k_z) = \int dk_x' dk_y' dk_z' I^f(k_x', k_y', k_z') S^f(k_x - k_x', k_y - k_y',)$ --

Column 9, Line 64      now reads: "$k_z)H^f(k_x,k_y,k_z - k_z')$"  
         should read -- $k_z)H^f(k_x,k_y,k_z - k'_z)$ --

Column 10, Line 28      now reads: "transformed illumination pattern if $(k_x',k_y',k_z')$ can be"  
         should read -- transformed illumination pattern $I^f(k'_x,k'_y,k'_z)$ can be --

Column 10, Line 48      now reads: "Fourier transform $H^f(x,y,z)$ that is to say the OTF and the"  
         should read -- Fourier transform $H^f(x,y,z)$ - that is to say the OTF- and the --

Column 10, Line 49      now reads: "specifically on the basis of the Fourier transform $IS_{em}^f(k_x,k_y,$"  
         should read -- specifically on the basis of the Fourier transform $IS_{em}^f(k_x,k_y,$ --

Column 12, Line 21      now reads: "Two possible concrete illumination patterns/(x, y, z) are"  
         should read -- Two possible concrete illumination patterns I(x, y, z) are --

Column 12, Line 30      now reads: "wherein $a_0$ indicates the intensity of the central beam and a"  
         should read -- wherein $\alpha_0$ indicates the intensity of the central beam and $\alpha$ --

Signed and Sealed this  
Eighteenth Day of October, 2022

Katherine Kelly Vidal  
*Director of the United States Patent and Trademark Office*

CERTIFICATE OF CORRECTION (continued)

Column 12, Line 39     now reads: "$I_{em}^f(k_x, k_y, k_z) = A_0 H^f(k_x, k_y, k_z) S^f(k_x, k_y, k_z) + A_2 H^f(k_x, k_y, k_z)$"

should read -- $I_{em}^f(k_x, k_y, k_z) = A_0 H^f(k_x,k_y,k_z) S^f(k_x,k_y,k_z) + A_2 H^f(k_x,k_y,k_z)$ --

Column 12, Line 40     now reads: "$\{S^f(k_x + 2*\hat{k}_x, k_y + 2*\hat{k}_y, k_z)e^{-i2\varphi-11} + S^f(k_x = 2*\hat{k}_x, k_y -$"

should read -- $\{S^f(k_x + 2*\hat{k}_x, k_y + 2*\hat{k}_y, k_z)e^{-i2\varphi-11} + S^f(k_x - 2*\hat{k}_x, k_y -$ --

Column 12, Line 44     now reads: "$(k_x + \hat{k}_x, k_y + \hat{k}_y, k_z)e^{-\varphi 01}$"

should read -- $(k_x - \hat{k}_x, k_y - \hat{k}_y, k_z)e^{i\varphi 01}$ --

Column 13, Line 19     now reads: "(11)"

should read -- (10) --

Column 13, Line 55     should read -- (11) --

Column 13, Line 61-65     now reads: "$I(x,y,z) = a_0^2/2 + 2*a^2 + 2*a^2 \cos(2*\hat{k}_y y + \varphi_{21}) + 2*aa_0 \cos(\hat{k}_x x + \hat{k}_y y + \varphi_{20})*\cos((\hat{k}-\hat{k}_z)z - \varphi_0) + 2*a^2 \cos(2*\hat{k}_x x + \varphi_{-21}) + a^2 \cos(2*\hat{k}_x x + 2*\hat{k}_y y + \varphi_{-22}) + 2*aa_0 \cos(\hat{k}_x x - \hat{k}_y y + \varphi_{10})*\cos((\hat{k}-\hat{k}_z)z - \varphi_0) + a^2 \cos(2*\hat{k}_x x - 2*\hat{k}_y y + \varphi_{-11})$    (12),"

should read -- $I(x,y,z) = a_0^2/2 + 2*a^2 + 2*a^2 \cos(2*\hat{k}_y y + \varphi_{21}) + 2*aa_0 \cos(\hat{k}_x x + \hat{k}_y y + \varphi_{20}) * \cos\left((\hat{k} - \hat{k}_z)z - \varphi_0\right) + 2*a^2 \cos(2*\hat{k}_x x + \varphi_{-21}) + a^2 \cos(2*\hat{k}_x x + 2*\hat{k}_y y + \varphi_{-22}) + 2*aa_0 \cos(\hat{k}_x x - \hat{k}_y y + \varphi_{10}) * \cos\left((\hat{k} - \hat{k}_z)z - \varphi_0\right) + a^2 \cos(2*\hat{k}_x x - 2*\hat{k}_y y + \varphi_{-11})$    (12) --

Column 14, Line 4     delete "(13)"

Column 14, Line 10     now reads: "$A_2\{H^f(k_x,k_y,k_z+[\hat{k}_z-\hat{k}])e^{i\varphi_0} + H^f(k_x,k_y,k_z-[\hat{k}_z-\hat{k}])e^{i\varphi_0}\} +$"

should read -- $A_2\{H^f(k_x,k_y,k_z+[\hat{k}_z-\hat{k}])e^{i\varphi_0} + H^f(k_x,k_y,k_z-[\hat{k}_z-\hat{k}])e^{i\varphi_0}\}$ --

Column 14, Line 30     should read -- (13) --

Column 14, Line 43     delete "(14)"

Column 14, Line 50     now reads: "$e^{i2\varphi 12} A_1 \sum_{k=-\infty}^{\infty} H^f\left(k_x, k_y, k_z - \frac{k}{\Delta z}\right) S^f\left(k_x, k_y, -2*\hat{k}_y, k_z - \frac{k}{\Delta z}\right) +$"

should read -- $e^{i2\varphi 21} A_1 \sum_{k=-\infty}^{\infty} H^f\left(k_x, k_y, k_z - \frac{k}{\Delta z}\right) S^f\left(k_x, k_y, -2*\hat{k}_y, k_z - \frac{k}{\Delta z}\right) +$ --

Column 15, Line 15     now reads: "$S^f\left(k_x - 2*\hat{k}_x, k_y + 2*\hat{k}_y, k_z - \frac{k}{\Delta z}\right) + e^{-i\varphi 10} e^{i\varphi 0} A_5$"

should read -- $S^f\left(k_x - 2*\hat{k}_x, k_y - 2*\hat{k}_y, k_z - \frac{k}{\Delta z}\right) + e^{-i\varphi 10} e^{i\varphi 0} A_5$ --

CERTIFICATE OF CORRECTION (continued)
U.S. Pat. No. 11,221,297 B2

| | |
|---|---|
| Column 15, Line 40 | now reads: "(15)"<br>should read -- (14) -- |
| Column 16, Line 27 | now reads: "$e^{-i2\varphi 10}e^{i\varphi 0}A_5 \sum_{k=-\infty}^{\infty} H^f(k_x - \frac{i}{\Delta x}, k_y - \frac{j}{\Delta y}, k_z + [\hat{k}_z - \hat{k}\ ] - \frac{k}{\Delta z})$,"<br>should read -- $e^{-i\varphi 10}e^{i\varphi 0}A_5 \sum_{k=-\infty}^{\infty} H^f(k_x - \frac{i}{\Delta x}, k_y - \frac{j}{\Delta y}, k_z + [\hat{k}_z - \hat{k}\ ] - \frac{k}{\Delta z})$ -- |
| Column 16, Line 58 | should read -- (15) -- |

In the Claims

| | |
|---|---|
| Column 18, Line 12 | now reads: "$\sum_k \int dk'_x dk'_y dk'_z I^f(k'_x, k'_y, k'_z) S^f\left(k_x - k'_x, k_y - k'_y, k_z - \frac{k}{\Delta z}\right)$,"<br>should read -- $\sum_k \int dk'_x dk'_y dk'_z I^f(k'_x, k'_y, k'_z) S^f\left(k_x - k'_x, k_y - k'_y, k_z - \frac{k}{\Delta z}\right)$ -- |
| Column 18, Line 22 | now reads: "$S^f\left(k_x - k_x', k_y - k_y', k_z - k/\Delta z\right)$ are Fourier transforms of the"<br>should read -- $S^f\left(k_x - k'_x, k_y - k'_y, k_z - \frac{k}{\Delta z}\right)$ are Fourier transforms of the -- |
| Column 18, Line 25 | now reads: "$IS_{emf}(k_x, k_y, k_z)$ is a Fourier transform of the recorded"<br>should read -- $IS^f_{em}(k_x, k_y, k_z)$ is a Fourier transform of the recorded -- |
| Column 18, Line 48 | now reads: "$\sum_k \int dk'_x dk'_y dk'_z I^f(k'_x, k'_y, k'_z) S^f\left(k_x - k'_x, k_y - k'_y, k_z - \frac{k}{\Delta z}\right) X$"<br>should read -- $\sum_k \int dk'_x dk'_y dk'_z I^f(k'_x, k'_y, k'_z) S^f\left(k_x - k'_x, k_y - k'_y, k_z - \frac{k}{\Delta z}\right) X$ -- |
| Column 18, Line 58 | now reads: "$S^f\left(k_x - k_x', k_y - k_y', k_z - k/\Delta z\right)$ are Fourier transforms of the"<br>should read -- $S^f\left(k_x - k'_x, k_y - k'_y, k_z - \frac{k}{\Delta z}\right)$ are Fourier transforms of the -- |
| Column 18, Line 61 | now reads: "$IS_{emf}(k_x, k_y, k_z)$ is a Fourier transform of the recorded"<br>should read -- $IS^f_{em}(k_x, k_y, k_z)$ is a Fourier transform of the recorded -- |